US006028381A

United States Patent [19]

Yumiyama et al.

[11] Patent Number: 6,028,381

[45] Date of Patent: Feb. 22, 2000

[54] STARTER EQUIPPED WITH CURRENT INTERRUPTION MECHANISM

[75] Inventors: Shigeru Yumiyama; Rikio Goto; Naoki Sumiya, all of Hitachinaka; Norikazu Sanuga, Ibaraki-ken; Atsushi Saeki, Hitachinaka, all of Japan

[73] Assignee: Hitachi, Ltd., Tokyo, Japan

[21] Appl. No.: 08/791,323

[22] Filed: Jan. 31, 1997

[30] Foreign Application Priority Data

Feb. 9, 1996 [JP] Japan .................................... 8-023792

[51] Int. Cl.[7] .......................... H02K 11/00; H02K 19/36; H01H 37/36

[52] U.S. Cl. ................... 310/68 C; 310/68 R; 290/38 R; 290/38 C; 337/401; 337/402

[58] Field of Search .................................... 310/66, 68 C, 310/68 R, 67 R, 71, 72; 318/473; 123/179.25; 290/38 R, 38 C, 48; 337/401, 402, 403, 404, 405; 335/142

[56] References Cited

U.S. PATENT DOCUMENTS

| | | | |
|---|---|---|---|
| 3,718,840 | 2/1973 | Tanaka et al. | 317/99 |
| 3,723,932 | 3/1973 | Miller et al. | 337/405 |
| 3,798,504 | 3/1974 | Kreissl et al. | 317/13 R |
| 4,360,715 | 11/1982 | Eeckhout | 219/253 |
| 4,481,424 | 11/1984 | Hattori et al. | 290/38 R |
| 4,674,344 | 6/1987 | Kazino et al. | 74/7 |
| 4,692,835 | 9/1987 | Setoguti et al. | 361/104 |
| 4,771,198 | 9/1988 | Aschberger et al. | 310/68 C |
| 4,789,800 | 12/1988 | Zimmermann | 310/68 C |
| 4,896,637 | 1/1990 | Yamamoto | 123/179 B |
| 5,089,735 | 2/1992 | Sawaguchi et al. | 310/88 |
| 5,130,560 | 7/1992 | Morishita et al. | 290/38 R |
| 5,494,010 | 2/1996 | Niimi et al. | 123/179.25 |

FOREIGN PATENT DOCUMENTS

| | | |
|---|---|---|
| 1981038 | 3/1968 | Germany . |
| 4-64972 U | 5/1992 | Japan . |

*Primary Examiner*—Nestor Ramirez
*Assistant Examiner*—Tran N Nguyen
*Attorney, Agent, or Firm*—Antonelli, Terry, Stout & Kraus, LLP

[57] ABSTRACT

Between a relay terminal of a direct current motor and a contact terminal of an electromagnetic switch, there is provided a fuse which is melted to cut off an electric current upon reaching a predetermined temperature. By properly setting the predetermined temperature at which the fuse melts, it is possible to make the fuse heated to a high temperature and melted in a relatively short time to cut off the electric current in the event of, for example, a continuous operative condition caused due to such a failure as fusion adhesion of a movable contact point with a B-terminal and an M-terminal or fusion adhesion of a contact point mechanism outside a starter, or an overcurrent supply condition caused upon a rotor being locked.

8 Claims, 3 Drawing Sheets

STARTER EQUIPPED WITH CURRENT INTERRUPTION MECHANISM

BACKGROUND OF THE INVENTION

The present invention relates to a starter for starting up an internal combustion engine.

Hitherto, it has been known to provide a thermally brittle portion in a current supply circuit within a starter to prevent an energized portion from being heated to a very high temperature and hence from being thermally brought into insulation breakdown, as disclosed in JP,U,4-64972.

In the above related art, a brush pigtail as one component of the current supply circuit within the starter serves also as a fuse which is thermally melted.

With this construction, if the current supply circuit is heated to a very high temperature due to continuous energization, the brush pigtail is melted to prevent the current supply circuit from reaching an excessively high temperature. But it cannot be said that satisfactory results are achieved in all respects.

SUMMARY OF THE INVENTION

More specifically, in the above related art, the brush pigtail on the plus side is provided with an insulation bush for sealing off the interior of a motor from the exterior and ensuring insulation against earthing parts such as a bracket and a yoke.

From the functional point of view as a part, the insulation bush is usually made of an inflammable material such as rubber. This means that if the pigtail is melted, the insulation bush deteriorates in itself due to the melting heat and possibly suffers insulation breakdown.

For example, when the pigtail (fuse) is made of copper and the insulation bush is made of rubber, the melting temperature of copper is 1000° C. and the carbonizing temperature of rubber is approximately in the range of 200 to 300° C. In this combination of materials, there is a possibility that even though abnormal operation, i.e., continuous energization, is ceased by the melting of the pigtail, the insulation bush deteriorates due to the melting heat generated upon the melting.

For the pigtail on the minus side, the insulation bush is not provided, but there is likewise a possibility that surrounding electrical insulators deteriorate due to the melting heat generated necessarily in the motor. Thus, the pigtail on the minus side is also not totally satisfactory.

An object of the present invention is to provide a starter which can prevent thermal insulation breakdown from occurring in an motor or an electromagnetic switch even if a current supply circuit is brought into abnormal operation, i.e., continuous energization.

To achieve the above object, according to the present invention, in a starter comprising a direct current motor including a rotor having an armature coil wound over an armature core and a commutator electrically connected to the armature coil, a first brush on the plus side for supplying an electric current to the commutator, and a second brush on the minus side, and an electromagnetic switch including a first terminal electrically connected to an external power supply, a second terminal electrically connected to the first brush, and a movable contact point for connecting and disconnecting between the first terminal and the second terminal, wherein an electric current interruption mechanism melting upon reaching a predetermined temperature to cut off supply of an electric current is provided in a conductive route interconnecting an end of a lead wire extended from the first brush and the second terminal at a position outside both the motor and the electromagnetic switch.

At the start-up of an internal combustion engine, when a key switch, for example, is turned on, the movable contact point connecting and disconnecting between the first terminal of the electromagnetic switch for being electrically connected to an external power supply and the second terminal electrically connected to the first brush of the direct current motor is closed to interconnect both the terminals, whereupon an electric current flows through an electric circuit including the external power supply, the first terminal, the movable contact point, the second terminal, the first brush, the commutator, the armature coil and the second brush. In other words, an electric current introduced from the external power supply to the starter flows through the route of first terminal of electromagnetic switch→movable contact point→second terminal→first brush of direct current motor→segment contacting first brush of commutator→armature coil→segment contacting second brush of commutator→second brush. Further, the electric current flows into the external power supply again through, e.g., a plate electrically connected to the second brush and then an end bracket. As a result, the rotor and the rotary shaft of the direct current motor are rotated. After the engine has started up, the key switch is returned to an off-state, whereupon the movable contact point is opened and the supply of the electric current is cut off to stop the rotation of the direct current motor.

In the present invention, the electric current interruption mechanism melting at the predetermined temperature is provided in the electric circuit between the first brush and the second terminal. Then, in the above-stated starter operation to start up the engine in a normal manner, since the starter operation lasts for a short time at maximum from several seconds to ten and several seconds, the electric current interruption mechanism does not develop its function. However, by properly setting the predetermined temperature at which the electric current interruption mechanism melts, it is possible to make the electric current interruption mechanism heated to a high temperature and melted in a relatively short time to cut off the electric current in the event of, for example, a continuous operative condition caused due to such a failure as fusion adhesion of the movable contact point with the first and second terminals or fusion adhesion of a contact point mechanism outside the starter, or an overcurrent supply condition caused upon the rotor being locked. Therefore, the electric circuit can be easily and surely cut off without affecting any inflammable materials such as electrical insulators which are often employed inside the direct current motor and the electromagnetic switch.

In the above starter, preferably, the electric current interruption mechanism is a fuse having a minimum current route section area smaller than the current route section areas of any other electrical conductors including lead wires.

With this feature, when all parts of the electric circuit are made of the same material, the electric current interruption mechanism having a minimum current route section area is surely melted earliest. It is therefore possible to positively cut off the electric current before any other inflammable materials in the electric current are heated and thermally brought into insulation breakdown.

Also, preferably, the above starter further comprises a contact terminal mounted on the electromagnetic switch and electrically connected to the second terminal and a relay terminal mounted on the direct current motor and electrically connected to the first brush, and the electric current interruption mechanism is provided between the contact terminal and the relay terminal.

By providing the electric current interruption mechanism between the contact terminal at an outlet of the electromagnetic switch and the relay terminal at an outlet of the direct current motor, the electric current interruption mechanism can be surely located outside both the direct current motor and the electromagnetic switch.

Moreover, preferably, the above starter further comprises a contact terminal mounted on the electromagnetic switch and electrically connected to the second terminal and a relay terminal mounted on the direct current motor and electrically connected to the first brush, and the electric current interruption mechanism is formed as an integral unitary body with the contact terminal.

In addition, preferably, the above starter further comprises a contact terminal mounted on the electromagnetic switch and electrically connected to the second terminal and a relay terminal mounted on the direct current motor and electrically connected to the first brush, and the electric current interruption mechanism is formed as an integral unitary body with the relay terminal.

DETAILED DESCRIPTION OF THE PREFERRED EMBODIMENTS

Preferred embodiments of the present invention will be hereunder described with reference to the drawings.

Figure 1:
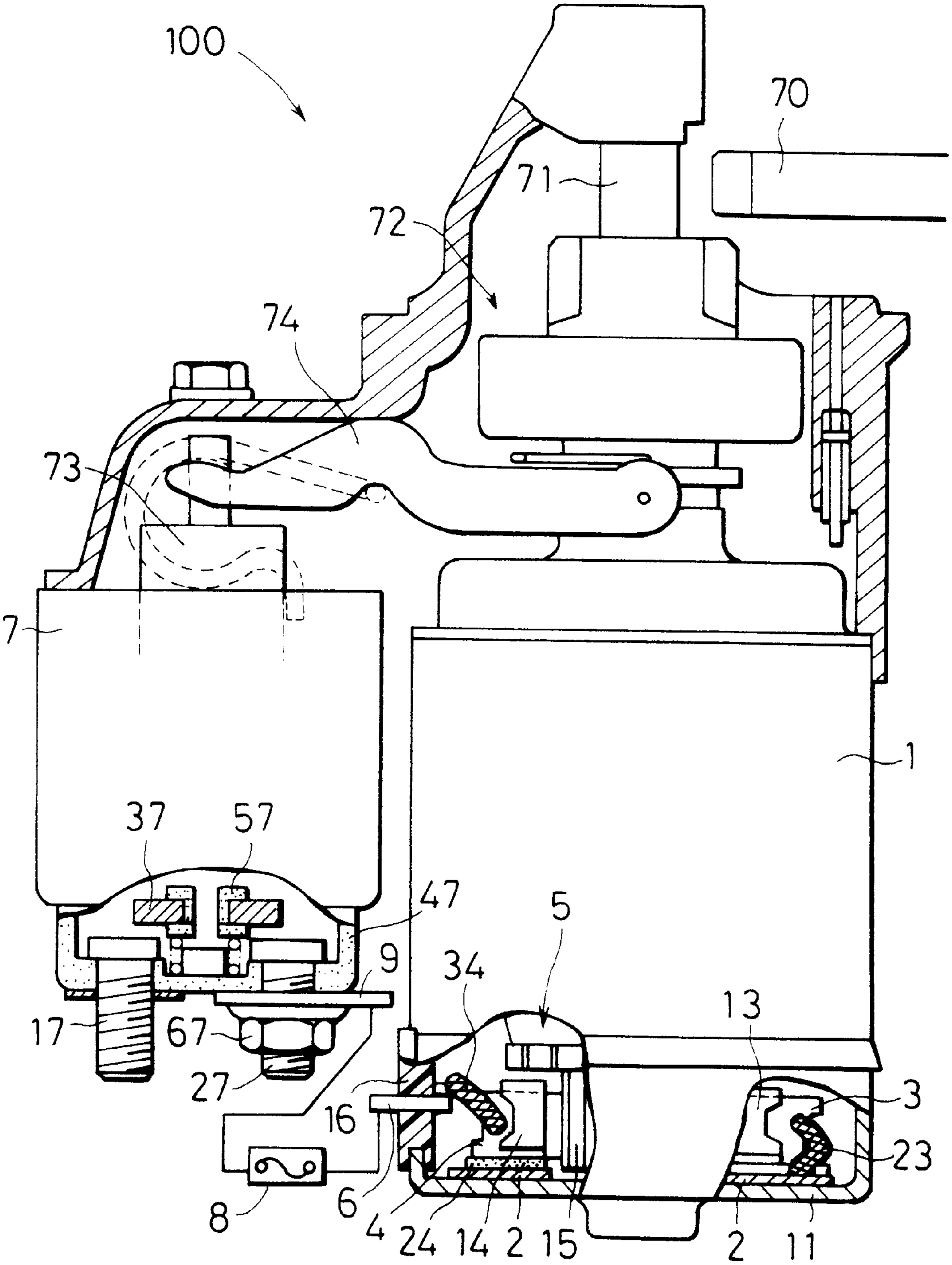
FIG. 1 is a side view, partly broken away, showing the entire structure of a starter according to a first embodiment of the present invention.

A first embodiment of the present invention will be described with reference to FIG. 1. FIG. 1 is a side view, partly broken away, showing the entire structure of a starter according to the first embodiment. In FIG. 1, a starter 100 is the so-called two-axis starter which comprises a direct current motor 1, an output shaft 71 for transmitting rotating force from the direct current motor 1 to a ring gear 70 of an internal combustion engine, an over running clutch 72 slidably fitted over the output shaft 71 and receiving the rotating force transmitted from the output shaft 71, an electromagnetic switch 7 including an electromagnet (not shown) and a plunger rod 73 driven under magnetic attraction when the electromagnet is excited, and a shift lever 74 coupled at one end to the plunger rod 73 and at the other end to the over running clutch 72.

The direct current motor 1 comprises a rotor 5 having an armature coil (not shown) wound over an armature core and a commutator 15 electrically connected to the armature coil, a metal-made end bracket 11, a metal-made plate 2 fixed to an inner bottom surface of the end bracket 11, a minus brush holder 13 directly fixed onto the plate 2, a minus brush 3 slidably held on the minus brush holder 13 and coming into contact with the commutator 15, a plus brush holder 14 fixed onto the plate 2 through an insulation board 24 therebetween, a plus brush 4 slidably held on the plus brush holder 14 and coming into contact with the commutator 15, and a relay terminal 6 electrically connected to the plus brush 4.

The minus and plus brushes 3, 4 are resiliently pressed by pushing springs (not shown) against the commutator 15 so as to come into contact with respective brush-side segments of the commutator 15. Further, the minus brush 3 is directly connected to the plate 2 by a lead wire 23, and the plus brush 4 is connected by a lead wire 34 to one end of the relay terminal 6 which locates within the direct current motor 1. The relay terminal 6 is held by an insulation bush 16 made of an elastic material and is fixed to the end bracket 11 through the insulation bush 16 with the other end of the relay terminal 6 projecting outward of the direct current motor 1.

The electromagnetic switch 7 has a B-terminal 17 electrically connected to a plus terminal of an external power supply (battery), an M-terminal 27 electrically connected to the plus brush 4 of the direct current motor 1, a movable contact point 37 capable of selectively connecting and disconnecting between the B-terminal 17 and the M-terminal 27, a contact terminal 9 fixed to the M-terminal 27 through a nut 67 and electrically connected to the M-terminal 27, an insulation part 47 for electrically insulating both the B-terminal 17 and the M-terminal 27 from adjacent parts, and an insulation part 57 for electrically insulating the movable contact point 37 from the adjacent parts. The movable contact point 37 is moved by the electromagnet built in the electromagnetic switch 7 at the same time as when the plunger rod 73 is moved under magnetic attraction.

Between the relay terminal 6 of the direct current motor 1 and the contact terminal 9 of the electromagnetic switch 7, there is provided a fuse 8 which is melted to cut off an electric current upon reaching a predetermined temperature. Specifically, because of being electrically connected to the plus brush 4 through the relay terminal 6 and to the M-terminal 27 through the contact terminal 9, the fuse 8 is surely located outside both the direct current motor 1 and the electromagnetic switch 7 so that the fuse 8 can develop its interruption function without affecting any machinery, tools and members inside the direct current motor 1 and the electromagnetic switch 7.

The operation and advantages of the starter 100 having the above-described construction will be described below.

At the start-up of the internal combustion engine, when a not-shown key switch, for example, is turned on and the electromagnet is excited, the movable contact point 37 connecting and disconnecting between the B-terminal 17 of the electromagnetic switch 7 electrically connected to the external power supply and the M-terminal 27 electrically connected to the plus brush 4 of the direct current motor 1 is closed to interconnect both the terminals 17 and 27, whereupon an electric current flows through an electric circuit including the external power supply, the B-terminal 17, the movable contact point 37, the M-terminal 27, the plus brush 4, the commutator 15, the armature coil and the minus brush 3. In other words, an electric current introduced from the external power supply to the starter 100 flows through the route of B-terminal 17 of electromagnetic switch 7→movable contact point 37→M-terminal 27→contact terminal 9→fuse 8→relay terminal 6 of direct current motor 1→lead wire 34→plus brush 4→segment contacting plus brush 4 of commutator 15→armature coil segment contacting minus brush 3 of commutator 15→minus brush 3→lead wire 23→plate 2→end bracket 11→external power supply. As a result, the rotor 5 and the rotary shaft of the direct current motor 1 are rotated. After the engine has started up, the key switch is returned to an off-state, whereupon the attraction force of the electromagnet is eliminated, the movable contact point 37 is opened, and the supply of the electric current is cut off to stop the rotation of the direct current motor 1.

In the starter 100 of this embodiment, the fuse 8 melting at the predetermined temperature is provided between the relay terminal 6 and the contact terminal 9. Then, in the above-stated starter operation to start up the engine in a normal manner, since the starter operation lasts for a short time at maximum from several seconds to ten and several seconds, the fuse 8 does not develop its interruption function. However, by properly setting the predetermined temperature at which the fuse 8 melts, it is possible to make the fuse 8 heated to a high temperature and melted in a relatively short time to cut off the electric current. Stated otherwise, in the event of, for example, a continuous operative condition caused due to such a failure as fusion adhesion of the movable contact point 37 with the B-terminal 17 and the M-terminal 27 or fusion adhesion of a contact point mechanism outside the starter 100, or an overcurrent supply condition caused upon the rotor 5 being locked, insulation breakdown of various electrical insulators (e.g., the insulation board 24, the insulation bush 16, and the insulation parts 47, 57), inflammable electrical conductors, etc., which are often employed inside the direct current motor 1 and the electromagnetic switch 7, can be prevented. Consequently, the peripheral parts and the internal combustion engine itself can also be protected against insulation breakdown.

In other words, there is no need of taking care more than usual to heat resistance of the peripheral machinery and tools. Also, there is no fear of an increase in the starter cost which would be inevitable when a flame resisting material is employed as the electrical insulators, or an increase in the size and weight of the starter 100 which would be inevitable when the starter is designed to be adapted for long-time rating.

While the M-terminal 27 of the electromagnetic switch 7 and the fuse 8 are connected to each other through the contact terminal 9 in the above-stated embodiment, the present invention is not limited thereto. As an alternative, the M-terminal 27 and the fuse 8 may be connected to each other directly. This modification can also provide similar advantages as with the illustrated embodiment.

Further, while the plus brush 4 of the direct current motor 1 and the fuse 8 are connected to each other through the relay terminal 6 in the above-stated embodiment, the present invention is not limited thereto. As an alternative, the plus brush 4 and the fuse 8 may be connected to each other directly. This modification can also provide similar advantages as with the illustrated embodiment.

Figure 2:
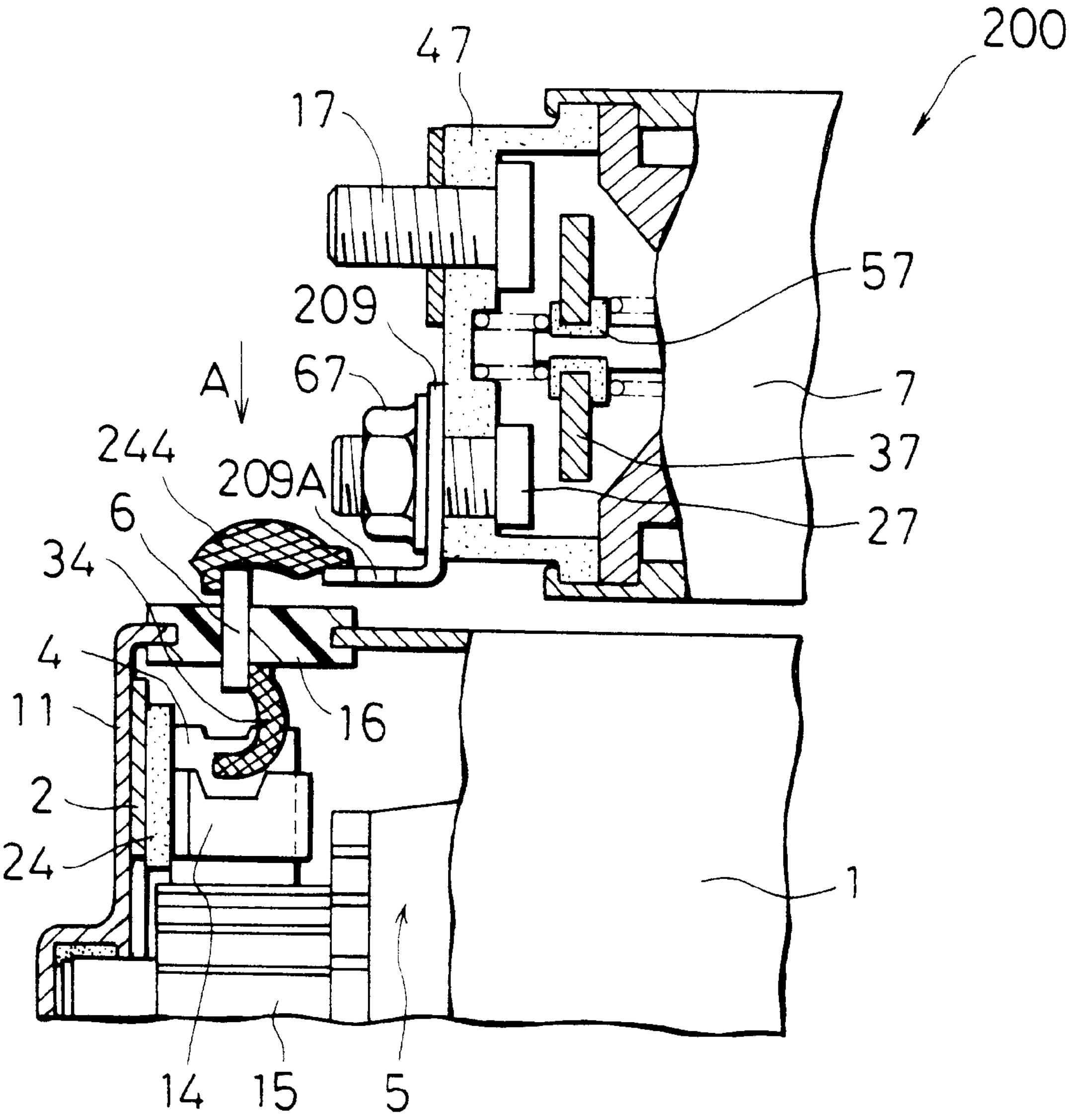
FIG. 2 is a side view, partly broken away, showing the structure of principal part of a starter according to a second embodiment of the present invention.
Figure 3:
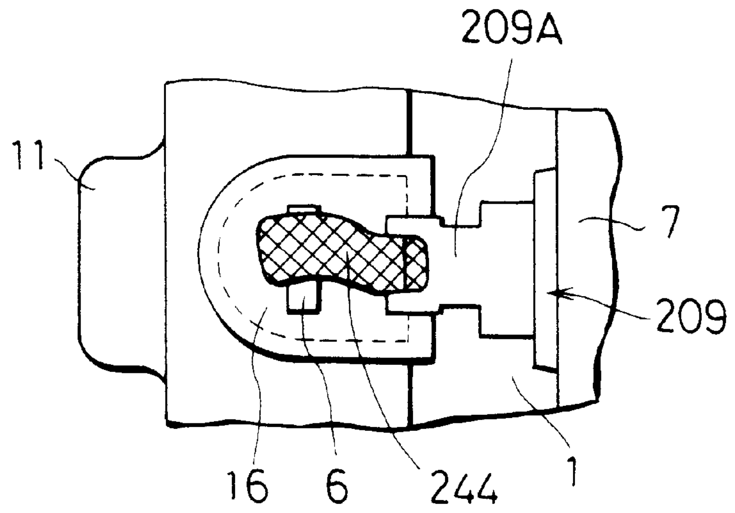
FIG. 3 is an enlarged view as viewed in the direction of arrow A in FIG. 2.

A second embodiment of the present invention will be described with reference to FIGS. 2 and 3. In this embodiment, a fuse and a contact terminal are formed to have an integral structure. FIG. 2 is a side view, partly broken away, showing the structure of principal part of a starter 200 according to this embodiment, and FIG. 3 is an enlarged view as viewed in the direction of arrow A in FIG. 2. In these drawings, equivalent members to those in FIG. 1 are denoted by the same reference numerals in the first embodiment. Referring to FIGS. 2 and 3, a primary point in which the starter 200 differs from the starter 100 of the first embodiment is the arrangement of a fuse. Specifically, a fuse portion 209A is provided in a contact terminal 209 of the electromagnetic switch 7 as an integral unitary body, and the contact terminal 209 is connected to the relay terminal 6 through a lead wire 244.

In that structure, the relationship between the lead wire 244 and the fuse portion 209A of the contact terminal 209 is set as follows. Though the lead wire 244 and the contact terminal 209 are both made of copper, the current route section area of the lead wire 244 is set so that the current density under a load (approximately from several seconds to ten and several seconds) at the normal start-up of the starter is about 27 A/mm$^2$, while the current route section area of the fuse portion 209A is set so that the current density under the same load is about 32 A/mm$^2$. In other words, the fuse portion 209A has a current route section area set smaller than that of the lead wire 244, causing an electric current to be concentrated in the smaller section area. Also, looking from relation to the other members, the fuse portion 209A is formed to be most quickly heated to a high temperature and first melted when an electric current continues flowing through the above-mentioned current supply circuit starting from the B-terminal 17, passing the plus brush 4, the commutator 15 and the minus brush 3, and leading to the end bracket 11. Accordingly, when the members making up the current supply circuit are all made of the same material, e.g., copper, the fuse portion 209A has a minimum current route section area.

The remaining structure is essentially the same as in the first embodiment.

This second embodiment can also provide similar advantages as with the first embodiment because the fuse portion 209A of the contact terminal 209 develops its interruption function. More specifically, assuming that the M-terminal 27 of the electromagnetic switch 7 and the relay terminal 6 of the direct current motor 1 are connected to each other by the lead wire 244 alone, in the event of a continuous operative condition caused due to such a failure as fusion adhesion of the movable contact point 37 with the B-terminal 17 and the M-terminal 27 or fusion adhesion of a contact point mechanism outside the starter 200, the lead wire 244 is melted in about 150 seconds with the current density of about 27 A/mm$^2$. During this period of time, the temperature of each member of the starter 200 continues rising and reaches about 500° C. in the vicinity of the plus brush 4, for example, immediately before the melting of the lead wire 244. This temperature as high as 500° C. means that it is very difficult to completely prevent insulation breakdown of inflammable materials such as various electrical insulators (e.g., the insulation board 24, the insulation bush 16, and the insulation parts 47, 57), inflammable electrical conductors, etc. However, since the starter 200 of this embodiment includes the fuse portion 209A, the fuse portion 209A is melted in about 120 seconds with the current density reaching about 32 A/mm$^2$ in the above hypothetical case before the temperature of the other members reaches 500° C. As a result, the above-mentioned insulation breakdown can be completely prevented.

Likewise, assuming that the M-terminal 27 and the relay terminal 6 are connected to each other by the lead wire 244 alone and there occurs an overcurrent supply condition upon the rotor 5 being locked, the current density of the lead wire 244 is about 90 A/mm$^2$. In the starter 200 of this embodiment, however, the current density of the fuse portion 209A is about 110 A/mm$^2$ in the event of such an overcurrent supply condition. Therefore, the fuse portion 209A is always first melted in about 10 seconds and, as a result, insulation breakdown can be completely prevented as with the above case.

A third embodiment of the present invention will be described with reference to FIG. 4. In this embodiment, a fuse and a relay terminal are formed to have an integral structure. In this drawing, equivalent members to those in FIG. 3 are denoted by the same reference numerals in the second embodiment.

Figure 4:
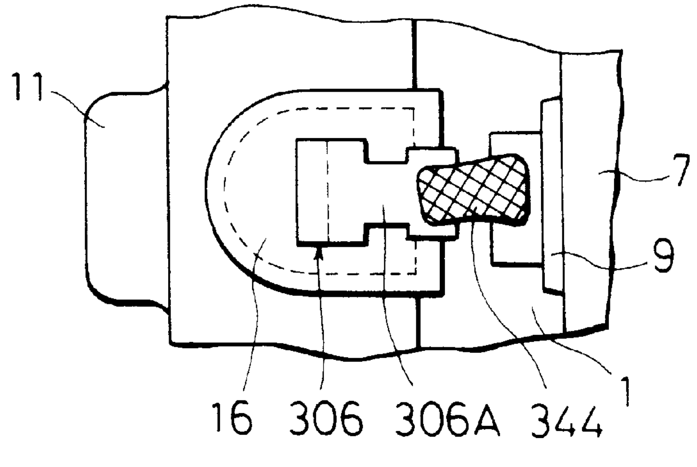
FIG. 4 is an enlarged view showing the structure of principal part of a starter according to a third embodiment of the present invention.

FIG. 4 is an enlarged view showing the structure of principal part of a starter according to this embodiment, the view corresponding to FIG. 3 showing the second embodiment. Referring to FIG. 4, a primary point in which the starter of this embodiment differs from the starter 200 of the second embodiment is the arrangement of a fuse. Specifically, a fuse portion 306A is provided in a relay terminal 306 of the direct current motor 1 as an integral unitary body therewith, and the relay terminal 306 is connected to the contact terminal 9 through a lead wire 344.

In that structure, the relationship between the lead wire 344 and the fuse portion 306A of the relay terminal 306 is set similarly to the above-stated relationship between the lead wire 244 and the fuse portion 209A of the contact terminal 209 set in the second embodiment. Though the lead wire 344 and the relay terminal 306 are both made of copper, the current route section area of the lead wire 344 is set so that the current density under a load (approximately from several seconds to ten and several seconds) at the normal start-up of the starter is about 27 A/mm$^2$, while the current route section area of the fuse portion 306A is set so that the current density under the same load is about 32 A/mm$^2$. In other words, the fuse portion 306A has a current route section area set smaller than that of the lead wire 344, causing an electric current to be concentrated in the smaller section area. Also, looking from relation to the other members, the fuse portion 306A is formed to be most quickly heated to a high temperature and first melted when an electric current continues flowing through the above-mentioned current supply circuit starting from the B-terminal 17, passing the plus brush 4, the commutator 15 and the minus brush 3, and leading to the end bracket 11. Accordingly, when the members making up the current supply circuit are all made of the same material, e.g., copper, the fuse portion 306A has a minimum current route section area.

The remaining structure is essentially the same as in the second embodiment.

This third embodiment can also provide similar advantages as with the second embodiment because the fuse portion 306A of the relay terminal 306 develops its interruption function. More specifically, assuming that the contact terminal 9 of the electromagnetic switch 7 and the plus brush 4 of the direct current motor 1 are connected to each other by the lead wire 344 alone, in the event of a continuous operative condition caused due to such a failure as fusion adhesion of the movable contact point 37 with the B-terminal 17 and the M-terminal 27 or fusion adhesion of a contact point mechanism outside the starter, the lead wire 344 is melted in about 150 seconds with the current density of about 27 A/mm$^2$. During this period of time, the temperature of each member of the starter continues rising and reaches about 500° C. in the vicinity of the plus brush 4, for example, immediately before the melting of the lead wire 344. This temperature as high as 500° C. means that it is very difficult to completely prevent insulation breakdown of inflammable materials such as various electrical insulators (e.g., the insulation board 24, the insulation bush 16, and the insulation parts 47, 57), inflammable electrical conductors, etc. However, since the starter of this embodiment includes the fuse portion 306A, the fuse portion 306A is melted in about 120 seconds with the current density reaching about 32 A/mm$^2$ in the above hypothetical case before the temperature of the other members reaches 500° C. As a result, the above-mentioned insulation breakdown can be completely prevented.

Likewise, assuming that the contact terminal 9 and the plus brush 4 are connected to each other by the lead wire 344 alone and there occurs an overcurrent supply condition upon the rotor 5 being locked, the current density of the lead wire 344 is about 90 A/mm$^2$. In the starter of this embodiment, however, the current density of the fuse portion 306A is about 110 A/mm$^2$ in the event of such an overcurrent supply condition. Therefore, the fuse portion 306A is always first melted in about 10 seconds and, as a result, the above-mentioned insulation breakdown can be completely prevented as with the above case.

In short, according to the present invention, an electric current interruption mechanism melting at a predetermined temperature is provided between a first brush and a second terminal of an electric circuit. By properly setting the predetermined temperature at which the electric current interruption mechanism melts, therefore, the electric current interruption mechanism can be heated to a high temperature and melted in a short time to cut off an electric current in the event of, for example, a continuous operative condition caused due to such a failure as fusion adhesion of a movable contact point with first and second terminals or fusion adhesion of a contact point mechanism outside a starter, or an overcurrent supply condition caused upon a rotor being locked. Accordingly, electrical insulators or the like which are often employed inside a direct current motor and an electromagnetic switch, can be prevented. As a result, peripheral parts and an internal combustion engine itself can be protected against adverse effects. In addition, there is no fear of an increase in the starter cost which would be inevitable when a flame resisting material is employed as the electrical insulators, or an increase in the size and weight of the starter which would be inevitable when the starter is designed to be adapted for long-time rating.

What is claimed is:

1. A starter comprising:

a direct current motor including a motor housing having disposed therein a rotor having an armature coil wound over an armature core and a commutator electrically connected to said armature coil, a first brush on the plus side for supplying an electric current to said commutator, and a second brush on the minus side;

an electromagnetic switch including a switch housing having disposed therein a first terminal electrically connected to an external power supply, a second terminal electrically connected to said first brush, and a movable contact point for connecting and disconnecting between said first terminal and said second terminal, for leading a current from said external power supply to said direct current motor through said first terminal, said movable contact point, said second terminal, and said first brush; and an electric current interruption mechanism adapted to melt upon reaching a predetermined temperature so as to totally cut off supply of an electric current to said direct current motor, wherein said electric current interruption mechanism is provided in a conductive route interconnecting an end of a lead wire extended from said first brush and said second terminal, at a position outside both said motor housing and said switch housing;

wherein said electric current interruption mechanism is a fuse having a minimum current route section area which is smaller than current route section areas of any other electrical conductors of said direct current motor and said electromagnetic switch, including lead wires;

further comprising a contact terminal mounted on said electromagnetic switch and electrically connected to said second terminal and a relay terminal, mounted on said direct current motor and electrically connected to said first brush, wherein said electric current interruption mechanism is formed as an integral unitary body with said contact terminal.

2. A starter comprising: a direct current motor including a motor housing having disposed therein a rotor having an armature coil wound over an armature core and a commutator electrically connected to said armature coil, a first brush on the plus side for supplying an electric current to said commutator, and a second brush on the minus side;

an electromagnetic switch including a switch housing having disposed therein a first terminal electrically connected to an external power supply, a second terminal electrically connected to said first brush, and a movable contact point for connecting and disconnecting between said first terminal and said second terminal, for leading a current from said external power supply to said direct current motor through said first terminal, said movable contact point, said second terminal, and said first brush; and an electric current interruption mechanism adapted to melt upon reaching a predetermined temperature so as to totally cut off supply of an electric current to said direct current motor, wherein said electric current interruption mechanism is provided in a conductive route interconnecting an end of a lead wire extended from said first brush and said second terminal, at a position outside both said motor housing and said switch housing;

wherein said electric current interruption mechanism is a fuse having a minimum current route section area which is smaller than current route section areas of any other electrical conductors of said direct current motor and said electromagnetic switch, including lead wires;

further comprising a contact terminal mounted on said electromagnetic switch and electrically connected to said second terminal and a relay terminal, mounted on said direct current motor and electrically connected to said first brush, wherein said electric current interruption mechanism is formed as an integral unitary body with said relay terminal.

3. A starter comprising:

a direct current motor including a motor housing having disposed therein a rotor having an armature coil wound over an armature core and a commutator electrically connected to said armature coil, a first brush for supplying an electric current to said commutator, and a second brush with respect to said commutator;

an electromagnetic switch including a switch housing having disposed therein a first terminal electrically connected to an external power supply, a second terminal electrically connected to said first brush, and a movable contact point for connecting and disconnecting between said first terminal and said second terminal, for leading a current from said external power supply to said direct current motor through a combination of said first terminal, said movable contact point, said second terminal, and said first brush; and an electric current fuse adapted to melt upon reaching a predetermined temperature so as to totally cut off supply of an electric current between said direct current motor and said electromagnetic switch, wherein said electric current fuse is provided at a position outside both said motor housing and said switch housing and as a meltable part of an electric current path between said direct current motor and said electromagnetic switch;

wherein said electric current fuse has a minimum current route section area which is smaller than other current route section areas of said direct current motor and said electromagnetic switch;

further comprising a contact terminal mounted on said electromagnetic switch and electrically connected to said second terminal, and a relay terminal mounted on said direct current motor and electrically connected to said first brush, wherein said electric current fuse is formed as an integral unitary body with said contact terminal.

4. A starter comprising:

a direct current motor including a motor housing having disposed therein a rotor having an armature coil wound over an armature core and a commutator electrically connected to said armature coil, a first brush for supplying an electric current to said commutator, and a second brush with respect to said commutator;

an electromagnetic switch including a switch housing having disposed therein a first terminal electrically connected to an external power supply, a second terminal electrically connected to said first brush, and a movable contact point for connecting and disconnecting between said first terminal and said second terminal, for leading a current from said external power supply to said direct current motor through a combination of said first terminal, said movable contact point, said second terminal, and said first brush; and an electric current fuse adapted to melt upon reaching a predetermined temperature so as to totally cut off supply of an electric current between said direct current motor and said electromagnetic switch, wherein said electric current fuse is provided at a position outside both said motor housing and said switch housing and as a meltable part of an electric current path between said direct current motor and said electromagnetic switch;

wherein said electric current fuse has a minimum current route section area which is smaller than other current route section areas of said direct current motor and said electromagnetic switch;

further comprising a contact terminal mounted on said electromagnetic switch and electrically connected to said second terminal, and a relay terminal mounted on said direct current motor and electrically connected to said first brush, wherein said electric current fuse is formed as an integral unitary body with said relay terminal.

5. A starter comprising:

a direct current motor including a motor housing having disposed therein a rotor having an armature coil wound over an armature core and a commutator electrically connected to said armature coil, a first brush on the plus side for supplying an electric current to said commutator, and a second brush on the minus side;

an electromagnetic switch including a switch housing having disposed therein a first terminal electrically connected to an external power supply, a second terminal electrically connected to said first brush, and a movable contact point for connecting and disconnecting between said first terminal and said second terminal, for leading a current from said external power supply to said direct current motor through said first terminal, said movable contact point, said second terminal, and said first brush;

an electric current interruption mechanism adapted to melt upon reaching a predetermined temperature so as to totally cut off supply of an electric current to said direct current motor, wherein said electric current interruption mechanism is provided in a conductive route interconnecting an end of a lead wire extended from said first brush and said second terminal, at a position outside both said motor housing and said switch housing; and further comprising a contact terminal mounted on said electromagnetic switch and electrically connected to said second terminal and a relay terminal, mounted on said direct current motor and electrically connected to said first brush, wherein said electric current interruption mechanism is provided between said contact terminal and said relay terminal.

6. A starter comprising:

a direct current motor including a motor housing having disposed therein a rotor having an armature coil wound over an armature core and a commutator electrically connected to said armature coil, a first brush for supplying an electric current to said commutator, and a second brush with respect to said commutator;

an electromagnetic switch including a switch housing having disposed therein a first terminal electrically connected to an external power supply, a second terminal electrically connected to said first brush, and a movable contact point for connecting and disconnecting between said first terminal and said second terminal, for leading a current from said external power supply to said direct current motor through a combination of said first terminal, said movable contact point, said second terminal, and said first brush;

an electric current fuse adapted to melt upon reaching a predetermined temperature so as to totally cut off supply of an electric current between said direct current motor and said electromagnetic switch, wherein said electric current fuse is provided at a position outside both said motor housing and said switch housing and as a meltable part of an electric current path between said direct current motor and said electromagnetic switch; and further comprising a contact terminal mounted on said electromagnetic switch and electrically connected to said second terminal, and a relay terminal mounted on said direct current motor and electrically connected to said first brush, wherein said electric current fuse is provided as part of an electric current path between said contact terminal and said relay terminal.

7. A starter comprising:

a direct current motor including a motor housing having disposed therein a rotor having an armature coil wound over an armature core and a commutator electrically connected to said armature coil, a first brush on the plus side for supplying an electric current to said commutator, and a second brush on the minus side;

an electromagnetic switch including a switch housing having disposed therein a first terminal electrically connected to an external power supply, a second terminal electrically connected to said first brush, and a movable contact point for connecting and disconnecting between said first terminal and said second terminal, for leading a current from said external power supply to said direct current motor through said first terminal, said movable contact point, said second terminal, and said first brush; and an electric current interruption mechanism adapted to melt upon reaching a predetermined temperature so as to totally cut off supply of an electric current to said direct current motor, wherein said electric current interruption mechanism is provided in a conductive route interconnecting an end of a lead wire extended from said first brush and said second terminal, at a position outside both said motor housing and said switch housing;

wherein said electric current interruption mechanism is a fuse having a minimum current route section area which is smaller than currant route section areas of any other electrical conductors of said direct current motor and said electromagnetic switch, including lead wires.

8. A starter comprising:

a direct current motor including a motor housing having disposed therein a rotor having an armature coil wound over an armature core and a commutator electrically connected to said armature coil, a first brush for supplying an electric current to said commutator, and a second brush with respect to said commutator;

an electromagnetic switch including a switch housing having disposed therein a first terminal electrically connected to an external power supply, a second terminal electrically connected to said first brush, and a movable contact point for connecting and disconnecting between said first terminal and said second terminal, for leading a current from said external power supply to said direct current motor through a combination of said first terminal, said movable contact point, said second terminal, and said first brush; and an electric current fuse adapted to melt upon reaching a predetermined temperature so as to totally cut off supply of an electric current between said direct current motor and said electromagnetic switch, wherein said electric current fuse is provided at a position outside both said motor housing and said switch housing and as a meltable part of an electric current path between said direct current motor and said electromagnetic switch;

wherein said electric current fuse has a minimum current route section area which is smaller than other current route section areas of said direct current motor and said electromagnetic switch.

* * * * *